INVENTOR.
MAURICE MESSER

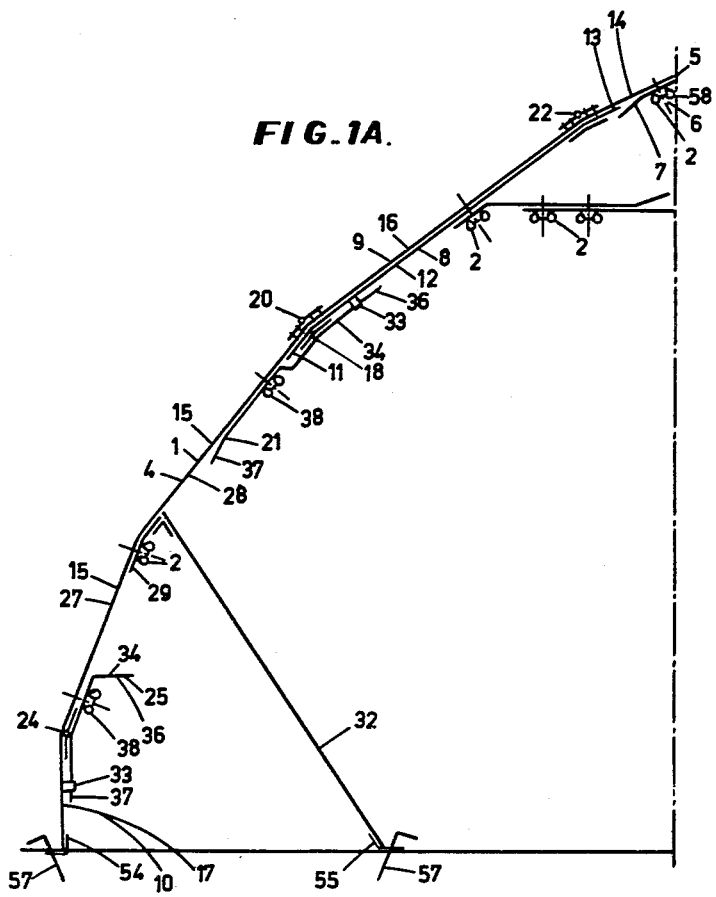
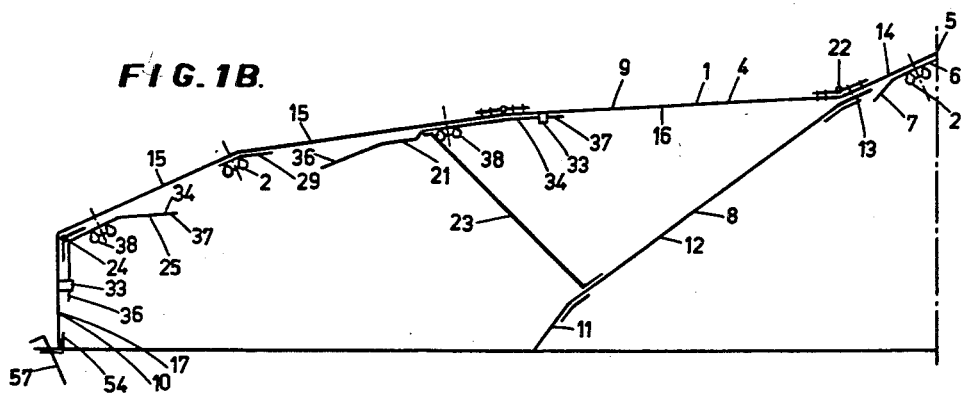

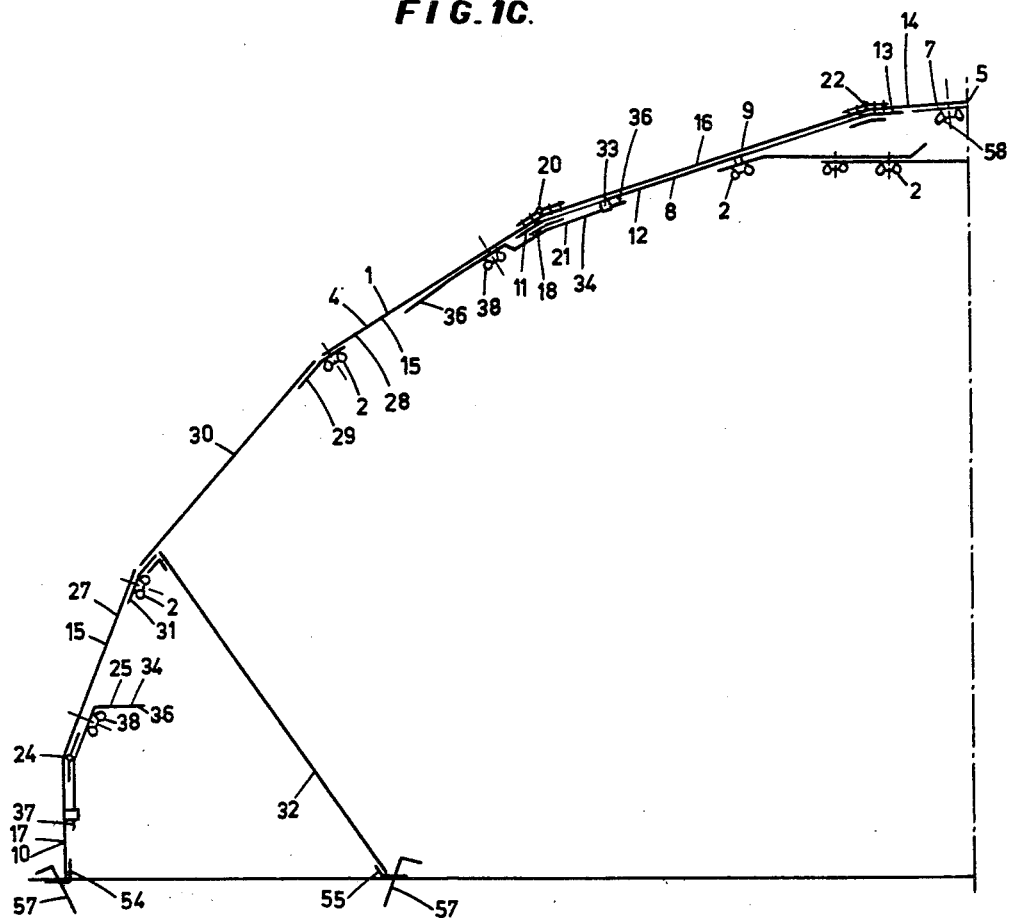

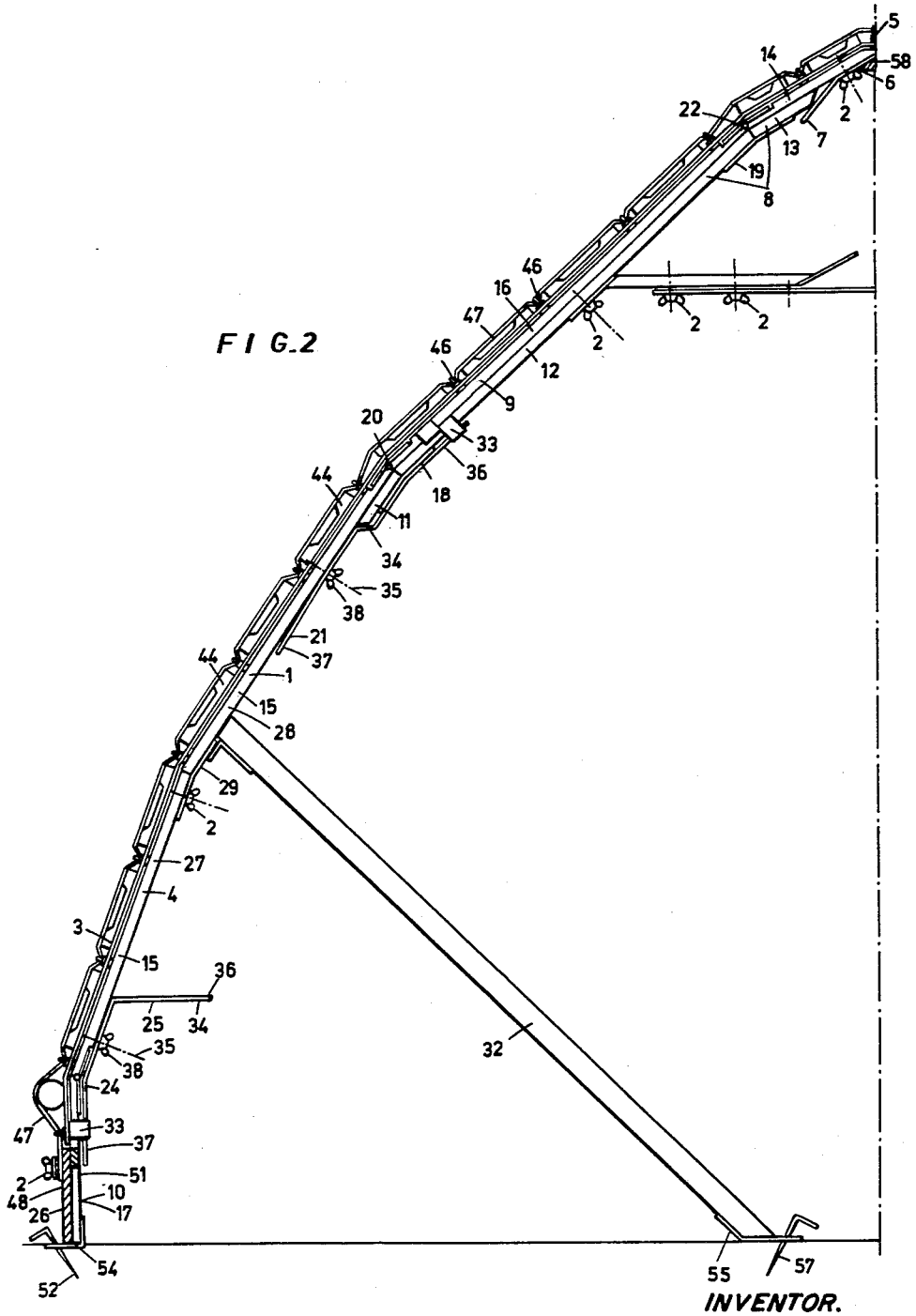

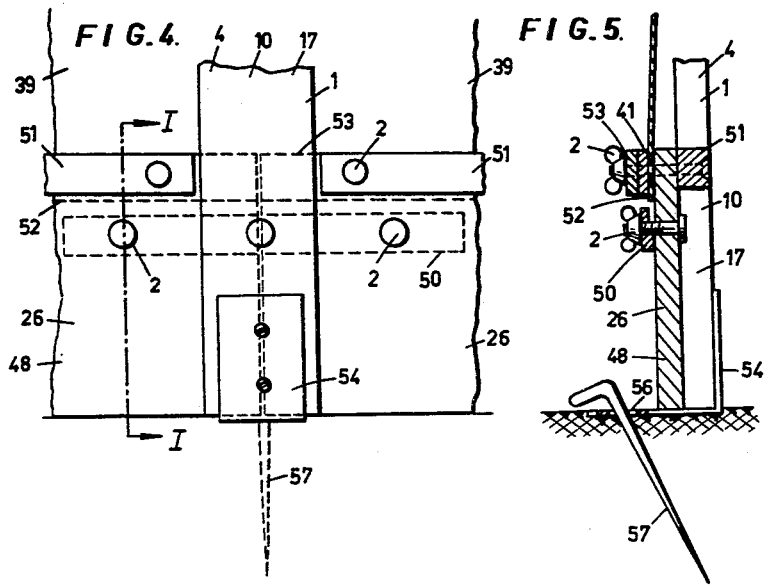
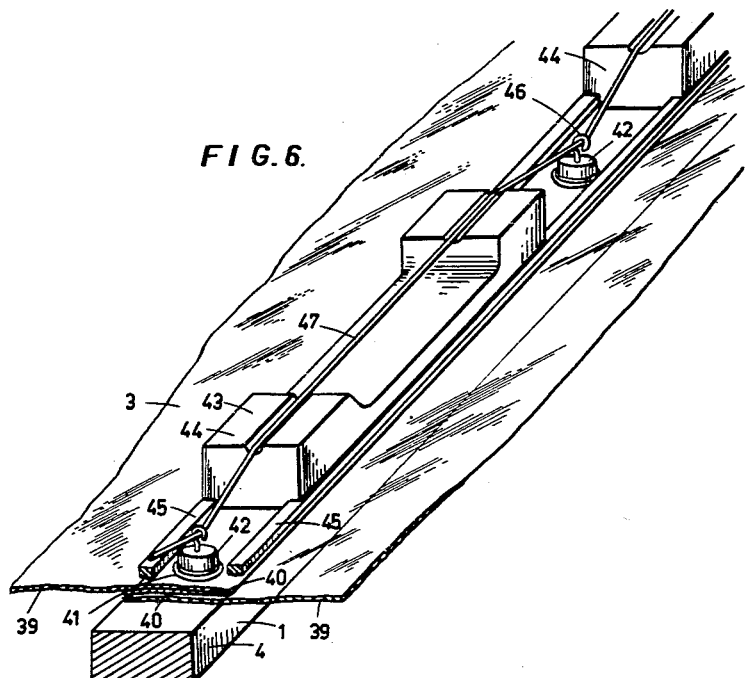

United States Patent Office 3,122,152
Patented Feb. 25, 1964

3,122,152
TRANSPORTABLE AND CONVERTIBLE SHELTER
Maurice Messer, 190 Rue Victor Hugo,
Brussels 4, Belgium
Filed Dec. 27, 1961, Ser. No. 162,522
Claims priority, application Belgium Dec. 30, 1960
11 Claims. (Cl. 135—1)

This invention relates to a transportable and convertible shelter of use inter alia as greenhouse, tent, shed or the like comprising: a rigid framework having a number of releasable elements interconnected by articulations and by rapid-assembly devices secured, for instance, by butterfly nuts, so as to form at least one arc; and a covering, preferably in the form of a plastic film, which covers the frame.

It is an object of this invention to provide a shelter, the dimensions of which can readily be adapted to actual operating conditions. For instance, a greenhouse is, of course, required to cover a very large ground area at the beginning of the season either to protect all the young plants which have been sown in the ground or for the cultivation of low plants. At this time, therefore, the greenhouse can be of very reduced height. Later, when the plants have become larger and hardier and the critical period of the frosts has passed, the protection is no longer necessary. It would therefore be an advantage if the greenhouse could then be moved elsewhere and adapted for the cultivation of tall plants.

To this end, in the shelter according to the invention each arc comprises two symmetrical risers which are interconnected at the top and which are each formed by at least two members—a bottom member which extends to the ground and a top member which extends to the ridge—the top and bottom members being interconnected by a lock and over-lapping over some of their length, the top of the bottom member being articulated to the top member at an intermediate part thereof near the top, so that when the two members of each of the risers are released by the locks being opened, the top members have their bottom ends placed on the ground without any change in inclination, while the bottom members spread out and reduce their inclination, so that the ground area covered by the lowered shelter is inclining and without impairing the stability of the frame, the top members acting as intermediate bearers.

In a preferred embodiment of the subject matter of the invention, the bottom member of each riser is extended by a third member terminating in an articulated element so that, whatever the inclination of the bottom member, the articulated element can be moved into any position in the plane of the arc including the vertical position and can therefore readily be secured to boarding surrounding the bottom of the shelter even if such boarding is not vertical.

Advantageously, the last-mentioned articulation is completed by a lock which locks the two elements adjacent the third member in one of two positions, one of which corresponds to the "normal" position of the shelter and the other of which corresponds to the "lowered" position of the shelter, so that the shelter can be converted rapidly, using the same elements, and without difficulty by the change of the position of the lock.

Also, the bottom member of each riser takes the form of at least two elements which are articulated to one another and which are locked in the required positions by a lock, so that the two elements include an angle between them and the bottom member is bulged outwards, thus making the peripheral parts of the ground covered by the shelter more accessible.

One of the two last-mentioned elements is adapted to have its length increased, for instance, by the interposition of an intermediate element, so that the shelter can be "superelevated."

To facilitate conversions, the covering is preferably in fabric or plastic film form and comprises separate strips so shaped that, when such strips are placed on the frame, their lateral edges overlap at the level of the risers and are secured thereto by means which can readily be released from below, over the required length of each riser, so that each strip can be raised without detaching the adjacent strips, and, therefore, any peripheral part of the ground covered by the shelter can readily be reached from the outside.

Other details and features of the invention will become apparent from the description of the accompanying drawings which illustrate, by way of non-limitative example, a particular embodiment of the subject matter of the invention and in which:

FIGS. 1A, 1B and 1C are diagrammatic end elevations of a shelter according to the invention shown respectively in the "normal," "low" and "high" positions;

FIG. 2 is an end elevation to an enlarged scale showing a riser in the "normal" position;

Figure 3A:
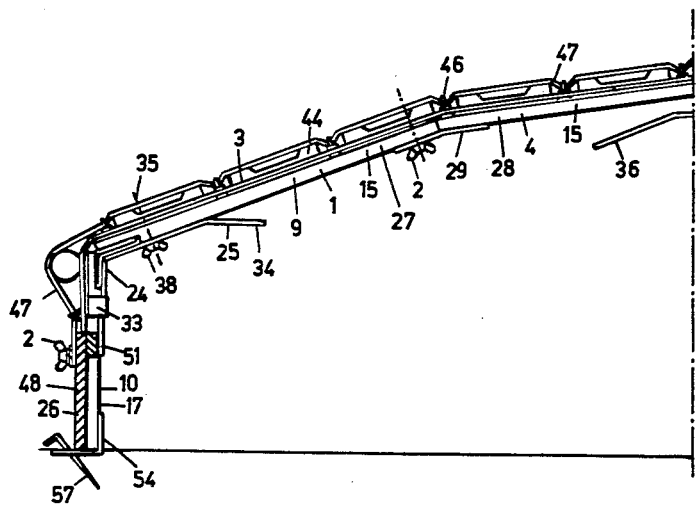
Figure 3B:
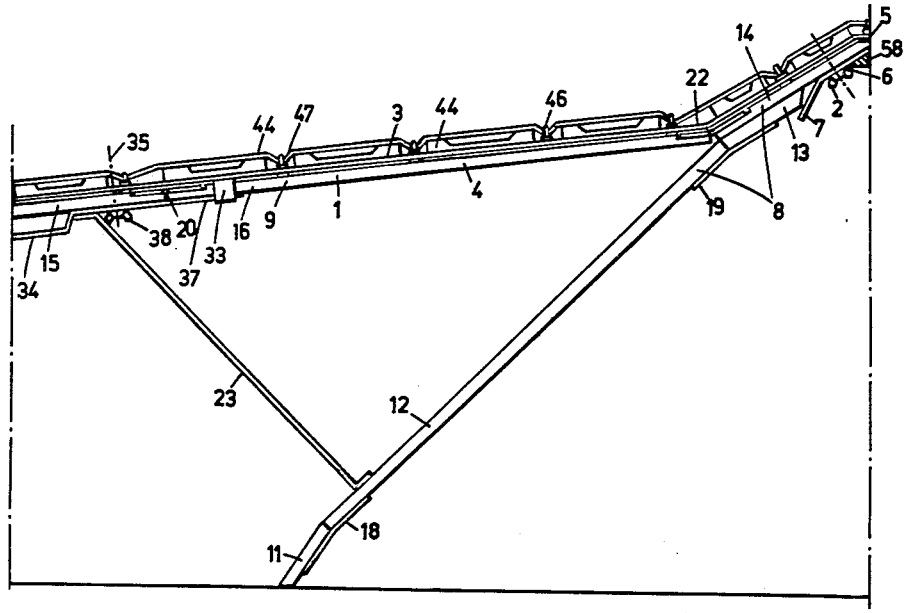
Figure 7:
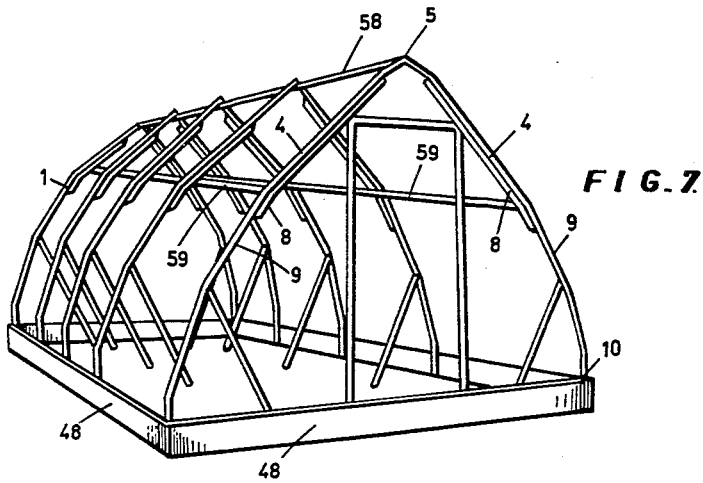
Figure 8:
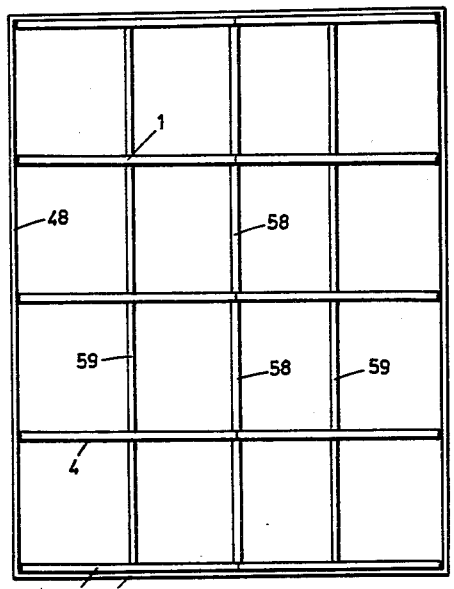
Figure 9:
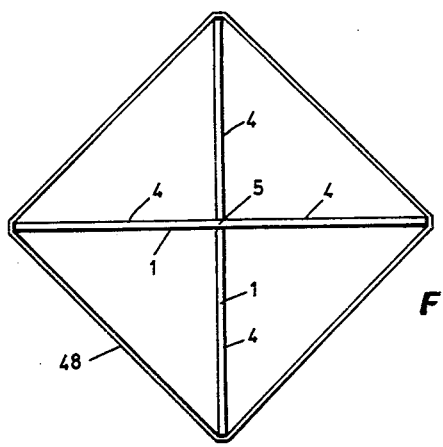

FIG. 3 (i.e. FIGS. 3a and 3b taken together) is an end elevation, to the same scale as FIG. 2, showing a riser in the "low" position;

FIG. 4 is an end elevation, to an enlarged scale, showing particulars of how the riser base and the boarding around the bottom of the shelter are secured;

FIG. 5 is a sectioned view taken along the line I—I of FIG. 4;

FIG. 6 is a perspective view to an enlarged scale showing the device for securing the lateral edges of the overlapping srips;

FIG. 7 is a perspective view of a shelter according to the invention in which the arcs formed by risers are parallel with one another;

FIG. 8 is a diagrammatic plan view showing the arrangement of the risers in the shelter shown in FIG. 7 and FIG. 9 is a diagrammatic plan view showing an alternative form of a shelter according to the invention in which the risers are disposed in cruciform fashion.

Like references denote like elements throughout the drawings.

The transportable and convertable shelter illustrated in the drawings is designed to act as a greenhouse and comprises a rigid frame 1 having a number of releasable elements interconnected by articulations, and rapid-assembly devices locked, for instance, by butterfly nuts 2 so that the elements form one or more arcs. The shelter comprises a covering 3 preferably in the form of a plastic film covering the frame 1.

According to the invention, each arc comprises two risers 4 interconnected at the top 5 by means of a rapid-assembly device 6 which takes the form of an appropriately bent strip 7 clamped by a butterfly nut 2. In the embodiment illustrated in the drawings, each riser 4 has three members 8, 9 and 10. The member 8 comprises elements 11, 12, 13 and 14; the member 9 comprises elements 15 and 16; and the member 10 comprises just a single element 17, as can be seen in FIGS. 2 and 3. The elements 11 to 14 of the member 8 are permanently connected to one another by strips 18 and 19 and form a single rigid member. The elements 15 and 16 of the member 9 are interconnected by an articulation 20 clampable by a lock 21. Since the same is normally closed, the elements 15 and 16 which form the member 9 also form a rigid member.

The two members 8 and 9 overlap over some of their length, and the top of the bottom member 9 is connected to the top member 8 by an articulation 22 near the top 5 of the shelter. The articulation 22 is so placed that, when the members 8 and 9 of each of the risers are released, the top members 8 are placed on the ground without changing their inclination, while the bottom members 9 spread apart laterally and reduce their inclination. Consequently, the ground area covered by the shelter when in the "low" position is increased very considerably without any need to use a different covering 3 and without impairing the stability of the frame 1, the top members 8 acting as intermediate supports. Stability can readily be improved by the provision between the members 8 and 9 of bracing elements 23 as shown in FIG. 3b.

The third member 10 extends the member 9, and the single element 17 forming the member 10 is connected to the element 15 of the member 9 by an articulation 24 clampable by a lock 25. The articulation 24 is so positioned that, whatever the inclination of the member 9, the element 17 can be moved into any position in the plane of the arc including the vertical position and can therefore readily be secured to the boarding 26 extending around the bottom of the shelter.

Since the position relative to one another of the three members 8, 9 and 10 in the "normal" and "low" positions of the shelter is fixed, the lock 25 is arranged to clamp the two adjacent elements 15, 17 in either of the two positions corresponding to the "normal" and to the "low" positions of the shelter. The shelter can therefore be converted very rapidly from the "normal" to the "low" position and vice versa without any groping or difficulty.

As previously stated, in the particular embodiment illustrated in the drawings the elements 15 and 16 of the bottom member 9 are interconnected by an articulation 20 supplemented by a lock 21 so that the adjacent elements 15 and 16, just like the elements 15 and 17, can be locked in two different positions. In both cases the elements 15 and 16 include an angle between them so that the member 9 is bulged outwards to improve access to the peripheral parts of the ground covered by the shelter.

The element 15, which has the greater inclination, comprises two parts 27 and 28 interconnected by a strip 29 secured by butterfly nuts 2. The element 15 can therefore readily be separated into its two parts and its length can be increased by the interposition of an extra element 30 having a strip 31 identical to the strip 29. The interposition of the extra elements 30 in the frame risers 4 therefore converts a "normal" shelter into a "high" shelter and increases the ground area covered. Of course, the element 15 could be telescopic, in which case there would be no need to use separate extra elements.

To keep the frames stable, the element 15 is braced by a bracing element 32 which bears at one end against the ground and at the other end against a part of the element 15. The bracing element 32 can be used for the "normal" and for the "high" shelter.

Each lock 21 or 25 for securing in predetermined positions the two adjacent elements 20 and 24 respectively interconnected by an articulation comprises: a hook 33 secured to one of the two adjacent elements; and a strip 34 rotating on a pivot 35 secured to the other adjacent element. The ends 36, 37 of the strip 34 are so bent that, depending upon the position selected, one such end is received in the hook 33 and secured therein by tightening the butterfly nut 38 screwed to the pivot 35. Consequently, when the shelter is converted, the adjacent elements 15, 16 and 15, 17 can be locked in the new position just by pivoting the strips 34 through 180°, then tightening the butterfly nuts 38.

Since the shelter illustrated in the drawing is intended to be used as a greenhouse, the covering 3 is in plastic film form and comprises separate strips 39 of a form such that, when such strips are placed on the frame 1, their lateral edges 40 overlap at the level of the risers 4 and are secured thereto by means which can readily be released from below over the required length of each riser 4. Each strip 39 can therefore be raised from below to reach any peripheral part of the ground covered by the shelter from outside by unfastening a predetermined portion of the corresponding strip, along one or both edges thereof; in such a case the adjacent strip or strips 39 may remain secured to the risers 4 if the edges of said strip are located below the strip which is raised or can be secured again to said risers after the strip which is raised has been unfastened if the edges of said strip are located above the edges of adjacent strips. In the embodiment illustrated in the drawings, the last-mentioned means comprise: eyelets 41 distributed over the whole length of the lateral edges 40; and studs 42 secured to the outer surface of the risers 4 so that, to secure the overlapping strips 39 to the frame 1, all that has to be done is to thread the eyelets 41 on the studs 42.

The shelter also comprises means for maintaining the eyelets 41 on the studs 42 and taking the form of a chain 43 formed by blocks 44 secured in spaced relationship to one another on two preferably plastic flexible strips 45. The blocks 44 are so distributed that, when the chain 43 is positioned, the flexible strips 45 take up a position one on either side of the studs 42, the latter appearing in the gaps between the blocks 44. Also, the top of each stud 42 has a hook 46 disposed below the level of the top surface of the blocks 44 and adapted to receive a string 47 which extends over the blocks 44 and which is stretched between two stationary places rigidly secured to the frame.

In a preferred embodiment of the shelter, the lateral edges 40 of the overlapping strips 39 of plastic film are bent on themselves and welded over their whole length to the strip 39 of which they form part. The lateral edges 40 of the overlapping strips 39 then have the form of flat heads which are wider than the eyelets 41 embedded therein and which are slightly inflated by the air which they contain. Consequently, when the covering 3 is fitted, the edges 40 of adjacent strips 39 are placed one upon another and compressed so that substantially complete sealing tightness is provided.

Extending around the bottom of the shelter, as with known shelters, is boarding 48 made of rot proof boards 26 which extend between consecutive uprights and which are interconnected by strips 50 secured by butterfly nuts 2 (FIG. 4): the butterfly nut 2 which is opposite the riser 4 secures the same as well as the board 26. The top edge of the boards 26 is strengthened by a longitudinal member 51 which is permanently secured to the inside of the boards 26 and which extends between consecutive risers 4. The bottom edge 52 of the overlapping strips 39 also forms a flat bead and has eyelets 41 and is retained by a relatively short lath 53 secured by butterfly nuts 2. The base 17 of the risers 4 and the bottom end of the bracing elements 32 each comprise a respective angle-member 54, 55 formed with an aperture 56. The shelter is secured to the ground by picket stakes 57 which extend through the apertures 56 and are driven into the ground on the skew.

A shelter according to the invention can, of course, comprise any number of arcs disposed parallel with one another and interconnected by connecting members 59 disposed between the bottom members 9 of adjacent risers 4 (FIGS. 7 and 8) and a ridge member 58 connecting adjacent members 8. Of course, the arcs can be arranged in some other way than that described; for instance, they can be arranged as a cross, as diagrammatically illustrated in FIG. 9.

Of course, the invention is not limited to the embodiments described which can be varied in many ways without departing from the scope of this invention, as defined by the appended claims.

I claim:

1. A transportable and convertible shelter of use inter alia as greenhouse, tent, shed or the like comprising: a rigid framework having a number of releasable elements interconnected by articulations and by rapid-assembly devices, secured, for instance, by butterfly nuts, so as to form at least one arc; and a covering, preferably in the form of a plastic film, which covers the frame, characterised in that each arc comprises two symmetrical risers which are interconnected at the top and which are each formed by at least two members, namely, a bottom member which extends to the ground and a top member which extends to the ridge, the top and bottom members being interconnected by a lock and overlapping over part of their length, the top of the bottom member being articulated to the top member at an intermediate part thereof near the top, so that when the two members of all the risers are released by the locks being opened, the top members have their bottom ends placed on the ground without any change in inclination, while the bottom members spread out and reduce their inclination, so that the ground area covered by the lowered shelter is increased very considerably without the need to use any other lining and without impairing the stability of the frame, the top members acting as intermediate bearers.

2. A shelter as claimed in claim 1, wherein the bottom member of each riser is extended by a third member terminating in an articulated element so that, whatever the inclination of the bottom member, the articulated element can be moved into any position in the plane of the arc including the vertical position and can therefore readily be secured to boarding surrounding the bottom of the shelter even if such boarding is not vertical.

3. A shelter as claimed in claim 2, wherein the articulation is completed by a lock which locks the two elements adjacent the third member in one of two positions, one of which corresponds to the "normal" position of the shelter and the other of which corresponds to the "lowered" position of the shelter, so that the shelter can be converted rapidly and without groping by the change of the position of the lock.

4. A shelter as claimed in claim 1, wherein the bottom member of each riser takes the form of at least two elements which are articulated to one another and which are locked in the required positions by a lock, so that the two elements include an angle between them and the bottom member is bulged outwards, thus making the peripheral parts of the ground covered by the shelter more accessible.

5. A shelter as claimed in claim 4, wherein one of the two last-mentioned elements is adapted is have its length increased, for instance, by the interposition of an intermediate element, so that the shelter can be "superelevated."

6. A shelter as claimed in claim 1, wherein each lock for locking in desired positions the two adjacent elements interconnected by a connector comprises: a hook secured to one of the two adjacent elements: and a strip rotatable on a pivot secured to the other adjacent element, the ends of the strip being bent so that, depending upon the position selected, one strip end engages in the hook and is immobilised therein by tightening a butterfly nut secured to the pivot, so that when the shelter is converted, the adjacent elements are locked in the new position just by pivoting the strip through 180° then tightening the butterfly nut.

7. A shelter as claimed in claim 1, wherein the covering, which is preferably in plastic film form, comprises separate strips so shaped that, when such strips are placed on the frame, their lateral edges overlap at the level of the risers and are secured thereto by means which can readily be released from below, over the required length of each riser, so that each strip can be raised and, therefore, any peripheral part of the ground covered by the shelter can readily be reached from the outside.

8. A shelter as claimed in claim 7, wherein the last-mentioned means comprise: eyelets distributed over the whole length of the lateral edges, and studs secured to the outer surface of the risers, so that the overlapping strips are secured to the frame just by threading the eyelets onto the studs.

9. A shelter as claimed in claim 8, which comprises means for maintaining the eyelets on the studs and taking the form of a chain formed by blocks secured in spaced relationship to one another on two flexible strips which are preferably made of plastic and which are so distributed that, when the chain is positioned, the strips take up a position one on either side of the studs, while the same appear in the gaps between the blocks.

10. A shelter as claimed in claim 9, wherein the top of each stud has a hook disposed below the level of the top surface of the blocks of the chain and adapted to receive a string placed on the blocks and stretched between two stationary places rigidly secured to the frame, so that the blocks are urged very forceably against the edges of the strips forming the covering.

11. A shelter as claimed in claim 7, wherein the lateral edges of the plastic film overlapping strips are bent on themselves and welded over their whole length to the strip of which they form part and therefore take the form of flat beads wider than the eyelets embedded in them, the beads being slightly inflated by the air which they contain, so that when the covering is fitted, the edges of adjacent strips are placed one upon another and then compressed, so that substantially complete sealing tightness is provided.

References Cited in the file of this patent

UNITED STATES PATENTS

| | | |
|---|---|---|
| 39,721 | Cross | Sept. 1, 1863 |
| 1,648,724 | Dakin | Nov. 8, 1927 |
| 1,666,757 | Snyder | Apr. 17, 1928 |
| 3,004,543 | Pinet | Oct. 17, 1961 |
| 3,017,893 | Greenbie | Jan. 23, 1962 |
| 3,028,872 | Cresswell | Apr. 10, 1962 |